No. 897,733. PATENTED SEPT. 1, 1908.
J. GODDARD.
CAMERA.
APPLICATION FILED MAR. 19, 1908.
2 SHEETS—SHEET 1.
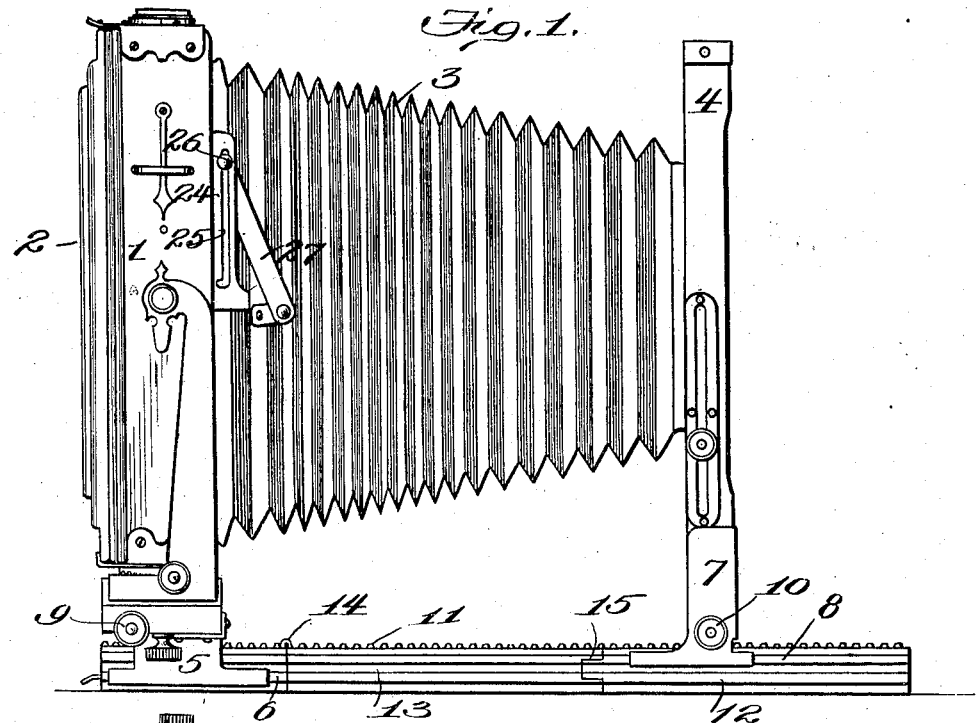
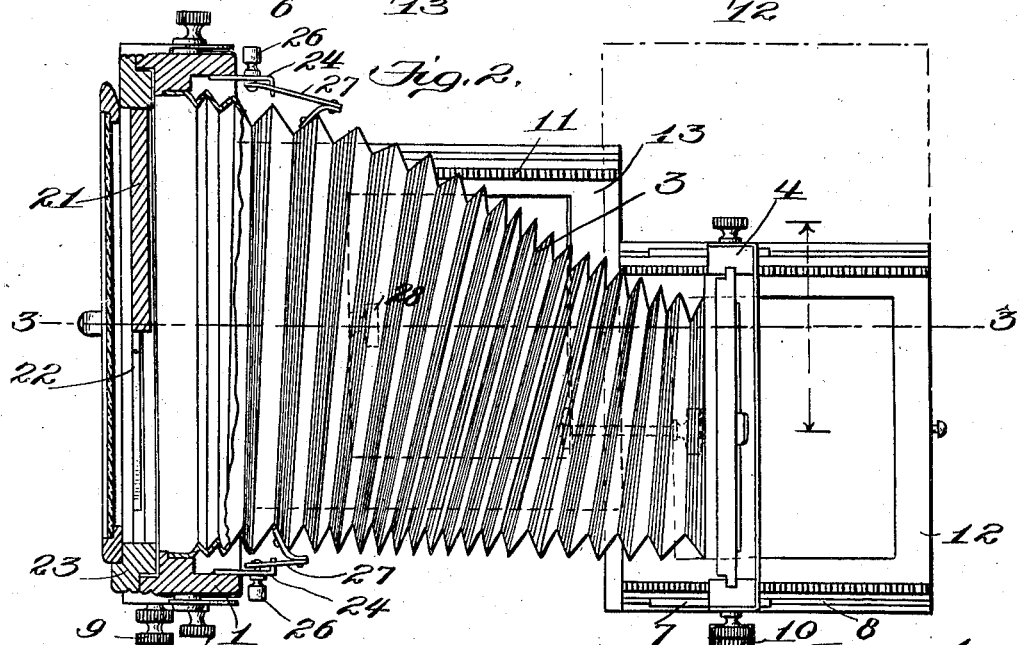
Witnesses:
Inventor
Joseph Goddard
By James L. Norris
Atty.

No. 897,733. PATENTED SEPT. 1, 1908.
J. GODDARD.
CAMERA.
APPLICATION FILED MAR. 19, 1908.
2 SHEETS—SHEET 2.
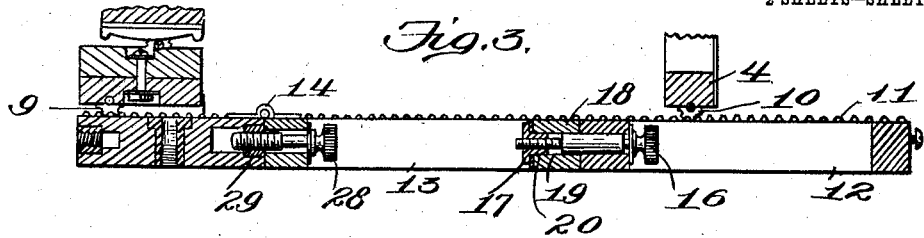
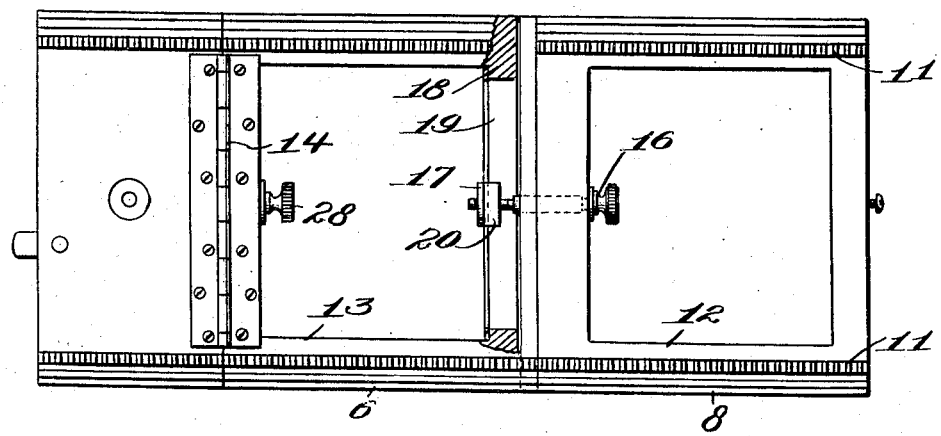
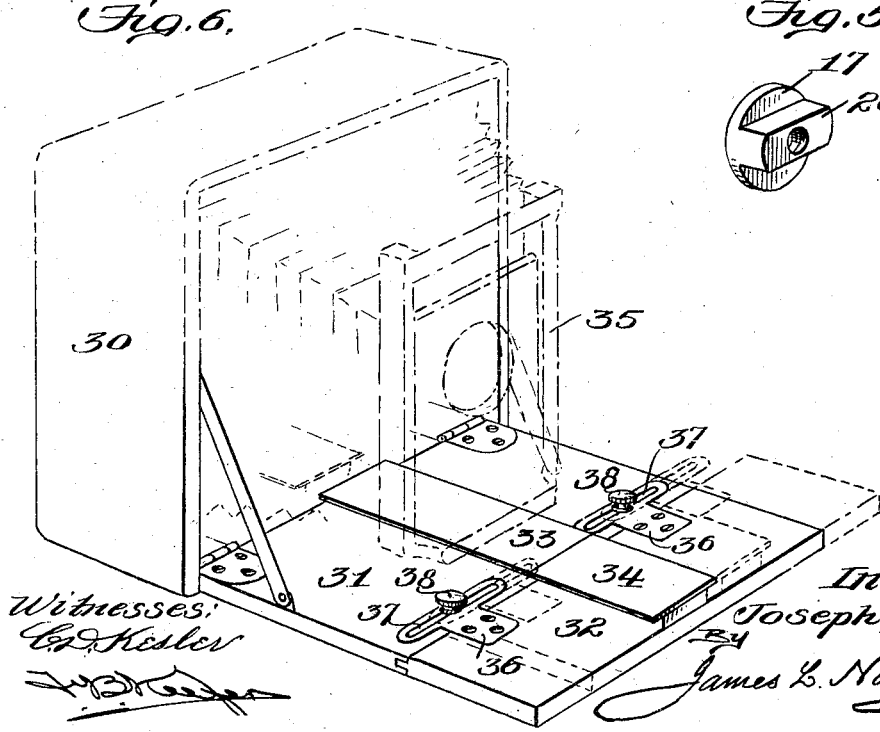
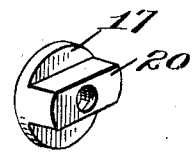
Witnesses:
Inventor
Joseph Goddard
By James L. Norris
Atty.

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

CAMERA.

No. 897,733.          Specification of Letters Patent.          Patented Sept. 1, 1908.

Application filed March 19, 1908. Serial No. 422,039.

*To all whom it may concern:*

Be it known that I, JOSEPH GODDARD, a citizen of the United States, residing at Rochester, in the county of Monroe and State of New York, have invented new and useful Improvements in Cameras, of which the following is a specification.

My present invention relates to improvements in cameras, and it has for its object primarily to provide for a relative lateral adjustment between the camera front and back in order that the lens may occupy a position at either side of the ground glass, this result being accomplished by mounting the front or the camera back upon a bed section which is shiftable in a direction transverse to the optical axis, whereby the construction of the camera is simplified, the manipulation thereof is facilitated, and the cost of manufacture is cheapened.

Another object of the invention is to provide an improved camera bed having suitable ways thereon for guiding the camera front or back to vary the distance between the lens and the ground glass or holder for the sensitized material, the bed being composed of relatively stationary and movable sections, the movable section being adapted to receive the camera front or the back, as the case may be, from the stationary section and to shift it laterally preferably in a plane parallel to the ground glass by a relative shifting movement of the movable bed section on the stationary bed section.

To these and other ends, the invention consists in certain improvements, and combinations and arrangements of parts, all as will be hereinafter more fully described, the novel features being pointed out particularly in the claims at the end of the specification.

In the accompanying drawings: Figure 1 is a side elevation of one form of camera constructed in accordance with my present invention; Fig. 2 represents a plan view partially in section, the shiftable bed section in this view being shown in one of its laterally offset positions; Fig. 3 represents a vertical section through the bed taken on the line 3—3 of Fig. 2; Fig. 4 represents a plan view of the bed, the camera box and front being shown removed; Fig. 5 is a perspective view of one of the parts used in the present instance for locking the laterally shiftable bed section in fixed relation to the stationary section of the bed; and Fig. 6 is a perspective view showing the present invention as applied to a folding camera.

Similar parts are designated by the same reference characters in the several views.

The primary object of the present invention is, as previously stated, to provide improved means for mounting the camera front whereby the latter may be adjusted laterally or to a position at either side of the longitudinal center of the camera, this object being accomplished essentially by providing a laterally shiftable bed section which supports and carries the front, and it is to be understood that the invention is capable of being applied generally to cameras of various types, and while it may be necessary in some instances to modify the construction or re-arrange the parts in order to accommodate the invention to cameras of different types, such modifications and other changes as may be necessary have been contemplated by me and are to be understood as included within the scope of my invention, the invention being shown in its present forms merely as specific embodiments thereof.

In Figs. 1 to 5, inclusive, the invention is shown in connection with a view camera, the latter comprising generally a camera box 1 having a ground glass and plate holder 2 suitably mounted at the back thereof, a bellows 3 and a front 4 which is connected to the camera box by the light-tight bellows and is adapted to receive the lens. The camera box and front are supported upon a bed which is adapted to rest upon a tripod or other suitable support. The camera box, front, bellows and other appurtenances may be of any suitable construction in so far as the present invention is concerned, the camera box however in the present instance being provided with slides 5 which coöperate with ways 6 formed at the sides of the bed and extending longitudinally thereof. The camera front is also capable of a sliding movement on the bed whereby its distance from the ground glass may be adjusted for focusing and other purposes, and in the present instance, this front is provided at its lower ends with slides 7 which coöperate with corresponding ways 8 formed at the vertical sides of the bed and extend longitudinally thereon. In order to facilitate the longitudinal movements of the camera box and front, these parts may be provided with pinion shafts 9 and 10 having the usual milled heads to facilitate the manipulation thereof, and the pinions on these shafts coöperate with a pair of racks 11 which preferably extend throughout the length of the bed.

The bed according to the present invention comprises a shiftable section 12 and a relatively stationary section 13, the latter section being usually fixed to the tripod or other support and in order to permit folding of a portion of the bed relatively to the camera box, the stationary section is divided transversely and provided with a hinge 14. In some instances, however, the stationary section may be made either in a single piece, or it may be attached directly to the camera box, as will be presently described.

In the present forms of the invention the shiftable section of the bed may be provided with suitable means for supporting this section in the same plane with the stationary bed section, a tongue and groove joint 15 being shown in the present instance and extending at right angles to the longitudinal center of the camera whereby the section 12 and the camera front thereon will be guided to move into a position in front of either side of the ground glass. The racks and ways may be cut or otherwise interrupted at a suitable point to permit the relative lateral movements of the bed section.

It is generally preferable to provide a suitable device for locking the shiftable bed section in either the central or offset position relatively to the stationary bed section, and in the present instance, such a locking device is shown comprising a screw 16 which extends through the rear portion of the bed section 12 and coöperates with a nut 17 which is slidable laterally in a cross-piece 18 forming part of the stationary bed section 13, this transverse strip being provided with a slot 19 through which the end of the screw 16 extends and in which an angular portion 20 of the nut slides. This slot may be of such a length that the angular portion of the nut engages its end walls to limit the laterally shifting movement of the section 12, the lens on the front board being thereby positioned so as to cover either half of the ground glass, or the position of the front may be adjusted while the image projected by the lens upon the ground glass is under observation.

In order to permit an exposure to be made upon each half of the sensitized material in the holder, it is preferable to provide a blind or shutter 21 for covering one portion of the sensitized material while an exposure is being made upon the other portion thereof. The blind or shutter in the present instance is slidable in grooves 22 extending transversely of the ground glass frame 23 whereby it may occupy a position at either side thereof. The camera shown in this embodiment of the invention is provided with a relatively long bellows, and in order to support the bellows so as not to interrupt the rays between the lens and the sensitized material, it is preferable to provide suitable bellows supporting devices, those shown in the present instance comprising brackets 24 fixed to the sides of the camera box and having vertical slots 25 to receive the pins 26 carried on the rear ends of links 27, the forward ends of the latter being pivotally attached to the sides of the bellows, these bellows supporting devices permitting the bellows to fold closely at one side of the camera and to expand at the opposite side thereof when the camera front is shifted laterally to a position at either side of the longitudinal center of the camera. In the camera shown in this embodiment of the invention, the hinged members composing the bed section 13 are locked in opened relation by means of a screw 28 which is attached to one of the members and has a threaded end which coöperates with a nut 29 mounted on the other member.

Fig. 6 of the drawing illustrates a manner of applying the present invention to cameras of the folding type, the camera in that instance comprising a box 30 having the bed hinged directly to the bottom thereof, the bed in this instance serving as a front which is adapted to close the box. The bed in this instance comprises a section 31, the rear edge of which is hinged to the camera box and a laterally shiftable section 32 which constitutes in effect a continuation or part of the section 31. In this instance the ways for guiding the camera front in its movements toward and from the camera box are formed by a central track which is made preferably in two sections 33 and 34, the section 33 being attached to the bed section 31 while the section 34 is attached to the shiftable bed section 32, the track being cut or otherwise interrupted to permit the relative shifting movements of the bed sections. The camera front 35 is mounted to slide on the track sections, the front moving from the track section 33 to the track section 34 when the bed section 32 is in alinement with or in central position relatively to the bed section 31. Any suitable means may be employed for guiding the shiftable bed section relatively to the stationary bed section, one of the sections, the shiftable bed section in the present instance, being provided with a pair of guiding brackets 36 having slots 37 which extend transversely with respect to the length of the track sections, and the other bed section being provided with clamping screws 38 which extend through the slots of the guiding brackets and bear upon the top of the latter to lock the bed sections in fixed relation.

In both forms of the invention shown, the camera front is adapted to rest directly upon a section of the bed, this bed section being mounted so as to permit a shifting movement thereof for the purpose of positioning the camera front at either side of the longitudinal center of the camera whereby a plurality of exposures may be made upon each plate, or a view of horizontally elongated objects may be obtained without distortion. It is to be understood, however, that my invention comprehends broadly the provision of a bed embodying a laterally shiftable section, and that either the camera front or the back may be mounted on such shiftable section, a relative lateral shifting of the front and back being accomplished in each instance whereby the optical axis of the lens may be arranged in line with the center or either side of the ground glass or the sensitized material.

Certain details have been mentioned in the description of the two embodiments of the invention, but it is to be understood that the invention is not limited in these respects, as I contemplate broadly the use of a laterally shiftable bed section which is adapted to support the camera front or back whereby the latter may be offset at either side of the longitudinal center of the camera.

I claim as my invention:—

1. A camera comprising a front and back, and a bed section shiftable rectilinearly in a direction laterally of the camera for relatively offsetting said front and back.

2. A camera embodying a lens support and a back, and a bed section slidable laterally relatively to the camera and adapted to receive and permit a longitudinal movement thereon of one of said parts.

3. A camera embodying a front, a back, and a bed provided with means to receive one of said parts, the bed being shiftable laterally of the camera to carry such part into a position at either side of the camera.

4. A camera having a bed comprising relatively laterally shiftable sections, said bed sections having means to receive and support the camera front and back respectively in relatively offset positions.

5. A camera embodying a bed comprising sections relatively shiftable laterally, and ways on the respective bed sections to receive the camera front and back, the ways being interrupted to permit relative lateral shifting movements of the bed sections.

6. A camera embodying a front and back, a bed comprising sections relatively shiftable in a direction laterally of the camera, and ways for one of such parts mounted on the respective bed sections and adapted to register when the bed sections are in alinement to permit movement of such part from one bed section to the other section.

7. A camera comprising a bed section shiftable in a direction substantially parallel to the focal plane of the lens to relatively displace the camera front and back transversely of the camera and permitting a focusing movement of one of said parts thereon.

8. A camera comprising a bed adjustable rectilinearly in a direction transversely of the camera and adapted to carry the camera front or back, said transversely adjustable bed permitting a focusing movement of the front or back with respect thereto.

9. A camera comprising a bed section shiftable in a rectilinear path laterally of the camera, and a lens support guided for movement longitudinally on said bed section and immovable laterally with respect thereto.

10. A camera comprising a bed section shiftable rectilinearly in a direction laterally of the camera and having means for guiding the camera front for movement longitudinally thereof, and means for locking said bed section in fixed relation to the camera.

11. A camera comprising a bed composed of sections lying in substantially the same plane and provided with ways for supporting the camera front and back and for permitting relative movement of the front and back longitudinally of the bed, means for guiding said bed sections for relative movement laterally of the camera, said ways being arranged to register when the bed sections are in alinement to permit one of the parts guided thereon to be transferred from one bed section to the other section, and means for locking the bed sections in fixed relation.

In testimony whereof I have hereunto set my hand in presence of two subscribing witnesses.

JOSEPH GODDARD.

Witnesses:
  CARRIE L. YOUNGER,
  GEO. I. GAGMAR.